US012768776B2

(12) United States Patent
Slater

(10) Patent No.: US 12,768,776 B2
(45) Date of Patent: Oct. 20, 2026

(54) CALIBRATION MATERIAL AND METHOD FOR CALIBRATING SPECTRAL RESPONSIVITY OF RAMAN SPECTROMETERS

(71) Applicant: Endress+Hauser Optical Analysis, Inc., Ann Arbor, MI (US)

(72) Inventor: Joseph B. Slater, Dexter, MI (US)

(73) Assignee: Endress+Hauser Optical Analysis, Inc., Ann Arbor, MI (US)

( * ) Notice: Subject to any disclaimer, the term of this patent is extended or adjusted under 35 U.S.C. 154(b) by 394 days.

(21) Appl. No.: 18/446,801

(22) Filed: Aug. 9, 2023

(65) Prior Publication Data

US 2025/0052668 A1 Feb. 13, 2025

(51) Int. Cl.
*G01N 21/65* (2006.01)
*G01N 21/27* (2006.01)

(52) U.S. Cl.
CPC ........... *G01N 21/274* (2013.01); *G01N 21/65* (2013.01)

(58) Field of Classification Search
CPC ............................. G01N 21/274; G01N 21/65
See application file for complete search history.

(56) References Cited

U.S. PATENT DOCUMENTS 9,662,047 B2 * 5/2017 Barman .................... G01J 3/44
11,287,384 B2 * 3/2022 Norwood .............. G01J 3/0297

FOREIGN PATENT DOCUMENTS

DE 102024132567 A1 * 7/2025 ................ G01J 3/28
EP 4465022 A1 * 11/2024 ......... G01N 21/6489

OTHER PUBLICATIONS

Tuschel, David, Raman Thermometry, Spectroscopy, Solutions for Materials Analysis, Dec. 2016, vol. 31, No. 12, Iselin, New Jersey.
Bingemann, Dieter, How to Collect Reproducible Raman Spectroscopy Data, , Wasatch Photonics, Inc., Apr. 5, 2021 (https://www.azom.com/article.aspx?ArticleID=20276, last accessed Aug. 9, 2023).

* cited by examiner

*Primary Examiner* — Uzma Alam
*Assistant Examiner* — Fani Polyzos Boosalis
(74) *Attorney, Agent, or Firm* — Gil M. Repa; Endress+Hauser (USA) Holding, Inc.

(57) ABSTRACT

A calibration material for calibrating a Raman spectrometer includes: a reference material configured to emit a broadband spectrum of luminescence light in response to receiving excitation light; and an additional material exhibiting a distinct Raman band within a spectral measurement range of the Raman spectrometer. A method of calibrating at least one Raman spectrometer using the disclosed calibration material includes: determining emission spectra of the calibration material at multiple temperatures; and calibrating each Raman spectrometer based on a calibration spectrum of the calibration material determined by the Raman spectrometer; determining a temperature of the calibration material by Raman thermometry; and adjusting a determination of spectral intensity values of intensity spectra performed by the respective Raman spectrometer based on the calibration spectrum, the temperature of the calibration material during calibration, and the emission spectra of the calibration material.

17 Claims, 3 Drawing Sheets

CALIBRATION MATERIAL AND METHOD FOR CALIBRATING SPECTRAL RESPONSIVITY OF RAMAN SPECTROMETERS

TECHNICAL FIELD

The present disclosure relates to a calibration material for calibrating a spectral responsivity of at least one Raman spectrometer and a method of calibrating a spectral responsivity of at least one Raman spectrometer using the calibration material.

BACKGROUND

Raman spectrometers are currently employed in a large variety of different applications including industrial applications, as well as laboratory applications to determine and to provide measurement values of various measurands of a medium. As an example, Raman spectrometers are employed to determine concentrations of components included in the medium, a pH-value of the medium, a melt index of the medium and/or a cell motility of the medium.

Conventional Raman spectrometers commonly include a light source transmitting monochromatic excitation light to a sample of the medium and a spectrometric unit receiving Raman scattered light emanating from the sample and determining and providing intensity spectra of the Raman scattered light. The intensity spectra are, e.g., provided to an evaluation unit, which determines and generates measurement values of the respective measurand based on a previously determined model for determining the measurement values based on spectral intensities of the intensity spectra.

Models used in Raman spectroscopy to determine quantitative measurement values of measurands can, for example, be determined based on measurements performed on samples exhibiting known values of the respective measurand and a detailed mathematical analysis of the sample spectra determined and provided by these measurements. The determination of suitable models is however a laborious and time-consuming process, in particular because of the complexity of the interdependencies between spectral intensities of the sample spectra and the known values of the measurand, and/or because of influences of other properties of the medium that may affect the spectral intensities and/or the spectral distribution of the measurement spectra. Correspondingly, there is a desire to use the same model or models on multiple Raman spectrometers.

However, different Raman spectrometers exhibit different spectral responsivities. As a result, the spectral shape and the absolute spectral intensities of intensity spectra of identical samples determined by different Raman spectrometers may be different. In consequence, reusing the same model on multiple Raman spectrometers requires the spectral responsivities of Raman spectrometers to be calibrated in a manner ensuring that they exhibit at least approximately identical spectral responsivities throughout their spectral measurement range.

U.S. Pat. No. 6,351,306 B1 discloses a method of calibrating the spectral responsivity of Raman spectrometers based on a known emission spectrum of a broadband intensity calibration light source, e.g., a tungsten lamp. According to this method, calibration spectra of light emitted by the intensity calibration light source determined with the Raman spectrometer to be calibrated are used to determine the spectral responsivity of the respective Raman spectrometer and to subsequently adjust a determination of spectral intensity values of the intensity spectra performed by the respective Raman spectrometer based on the calibration spectra and the known emission spectrum of the broadband intensity calibration light source.

A disadvantage of this method is, however, that anything which may alter the spectral balance of the light emitted by the broadband intensity calibration light source and its presentation to the spectrometric unit of the respective Raman spectrometer will contribute to a corresponding calibration error, e.g., a calibration error due to an incorrect determination and/or an incorrect adjustment of the spectral responsivity. As an example, when a tungsten bulb is used as a black body radiator, variations of a drive current supplied to the tungsten bulb, as well as aging of a filament of the tungsten bulb, may alter the emissivity of the broadband intensity calibration light source. In addition, light propagation path(s) of light emitted by the black body radiator may deviate from the light propagation path(s) of light emanating from a sample of the medium during spectroscopic measurements of the measurand(s) performed with the respective Raman spectrometer. Thus, differences of the light propagation path(s) may also contribute to a corresponding calibration error.

As an alternative, spectral responsivity calibration measurements may be performed on reference materials emitting known emission spectra in response to being illuminated by excitation light. In such methods, a reference material is illuminated by the light source of the Raman spectrometer to be calibrated, and an adjustment of the determination of the spectral intensity values of the intensity spectra performed by the Raman spectrometer is performed based on the calibration spectra of the reference material determined by the Raman spectrometer and the known emission spectrum of the reference material.

Reference materials suitable for this purpose include standard reference materials (SRM) developed for a number of different excitation wavelengths by the National Institute of Standards and Technology (NIST) for relative intensity correction of Raman spectroscopic instruments. These standard reference materials include specific types of fluorescent glasses, which are available together with published emission spectra of these standard reference materials.

Reference materials illuminated by the light source of the Raman spectrometer more truly account for the position of the sample and the corresponding light propagation path(s). However, a disadvantage of reference materials such as fluorescent glasses is that they are sensitive to temperature. Correspondingly, known emission spectra of these reference materials are only valid in a narrow temperature range surrounding a reference temperature of the reference material at which the emission spectra were determined.

Certain improvements with respect to spectral responsivity calibrations performed based calibration spectra of reference materials may be achieved by a method for improving calibration transfer between multiple Raman analyzer installations disclosed in U.S. Pat. No. 11,287,384 B2. According to this method, a plurality of SRMs is provided, and reference spectra for each SRM sample are generated under factory-controlled conditions using identical measurement instrumentation and measurement parameters. The method further includes calibrating the intensity axis of Raman spectrometers at multiple Raman analyzer installations based on Raman calibration spectra of the SRM samples determined by the respective Raman spectrometer and the previously determined reference spectra of the SRM sample.

U.S. Pat. No. 11,287,384 B2 further discloses accounting for the temperature dependency of the emission spectra of these reference materials based on temperature measurements of the temperature of the SRM samples performed by an additional temperature measurement device, which enables temperature compensated spectral responsivity calibrations. Disadvantages are, however, that the method requires a temperature measurement device that may not always be available, and that the method can only be applied to Raman spectrometer configurations that allow for the temperature measurement device to be positioned in the vicinity of the SRM sample.

Accordingly, there remains a need for further contributions in this area of technology.

As an example, there is a need for a calibration material and/or a calibration method enabling accurate temperature compensated spectral responsivity calibrations of Raman spectrometers without requiring an additional temperature measurement device measuring the temperature of the calibration material and/or without requiring for the temperature of the calibration material to be controlled such, that it occurs within a very narrow temperature range.

SUMMARY

The present disclosure includes a method of calibrating at least one Raman spectrometer, each Raman spectrometer including a monochromatic light source configured to transmit excitation light having a desired excitation wavelength to a measurement region configured to accommodate a sample of a medium and a spectrometric unit configured to receive measurement light emanating from the illuminated sample and configured to determine and to provide intensity spectra of the received measurement light in a spectral measurement range, the method comprising:

- providing a calibration material, the calibration material comprising a reference material configured to emit a broadband spectrum of luminescence light in response to the reference material receiving excitation light having the desired excitation wavelength and an additional material exhibiting a distinct Raman band within the spectral measurement range of the Raman spectrometer(s) to be calibrated;
- for at least two different temperatures determining an emission spectrum of light emitted by the calibration material exhibiting the respective temperature in response to the calibration material receiving excitation light having the desired excitation wavelength; and calibrating each Raman spectrometer by:
- with the respective Raman spectrometer determining a calibration spectrum of the calibration material;
- based on the Raman band included in the calibration spectrum determining a temperature of the calibration material by performing a method of Raman thermometry; and
- adjusting a determination of spectral intensity values of intensity spectra performed by the respective Raman spectrometer based on the calibration spectrum, the temperature of the calibration material of the calibration spectrum and the previously determined emission spectra of the calibration material.

The calibration material including the reference material and the additional material provides the advantage, that both the current spectrometric responsivity of each Raman spectrometer and the temperature of the calibration material during determination of the respective calibration spectrum can be determined based on the calibration spectra of the calibration material.

Determining the temperature of the calibration material during determination of the calibration spectra provides the advantage, that a highly accurate calibration of the spectral responsivity of each Raman spectrometer is attained in a manner accounting for the temperature of the calibration material during calibration and the temperature dependency of the emission spectra of the calibration material.

The method further provides the advantages, that the calibration material can be used in a much wider temperature range than reference materials employed in the prior art, and that it neither requires for the temperature of the calibration material to be controlled nor to be measured by an additional temperature measurement device during determination of the calibration spectra.

In certain embodiments, providing the calibration material includes manufacturing the calibration material by melting the reference material and distributing a powder of the additional material in the melted reference material.

In alternative embodiments, providing the calibration material includes manufacturing the calibration material by applying at least one layer of the additional material onto an exterior surface of the reference material, or by depositing at least one layer of the additional material onto an exterior surface of the reference material by performing a deposition process, a low temperature deposition process or a vacuum deposition process.

In a first embodiment, for at least one or each Raman spectrometer the temperature of the calibration material is determined based on the calibration spectrum by determining a peak position of a Raman peak associated to the Raman band of the additional material that is included in the calibration spectrum, and determining the temperature of the calibration material based on the peak position of the Raman peak included in the calibration spectrum and a previously determined relationship between peak positions of Raman peaks associated to the Raman band exhibited by the additional material and the temperature of the calibration material.

Certain embodiments of the method according to the first embodiment further comprise a method step of determining the relationship between peak positions of Raman peaks associated to the Raman band exhibited by the additional material and the temperature of the calibration material based on peak positions of Raman peaks included in emission spectra and the temperatures of the calibration material for which the emission spectra have been determined.

In certain embodiments of the first embodiment, the Raman peaks are Stokes Peaks occurring in the spectral measurement range of the respective Raman spectrometer.

The disclosure further includes a second embodiment, wherein:

- the Raman spectrometer(s) to be calibrated include at least one dual range spectrometer capable of determining intensity spectra in a range including the spectral measurement range and an additional range; wherein the spectral measurement range is a range covering a Stokes region including spectral lines corresponding to wavelengths that are longer than the excitation wavelength and the additional range is a range covering an anti-Stokes region including spectral lines corresponding to wavelengths that are shorter than the excitation wavelength;

the emission spectra of the calibration material are each determined in a spectral range including the spectral measurement range and the additional range; and for at least one or each of the dual range spectrometers the calibration spectrum of the calibration material is determined in the spectral range including the spectral measurement range and the additional range; and the temperature of the calibration material is determined based on the calibration spectrum by:

determining a ratio of a peak intensity of a Stokes Raman peak included in the calibration spectrum and a peak intensity of an anti-Stokes Raman peak included in the calibration spectrum, wherein the Stokes Raman peak and the anti-Stokes Raman peak are both associated to the Raman band of the additional material; and determining the temperature of the calibration material based on the ratio of the peak intensity of the Stokes Raman peak included in the calibration spectrum and the peak intensity of an anti-Stokes Raman peak included in the calibration spectrum and a previously determined relationship between ratios of the peak intensities of Stokes Raman peaks and anti-Stokes Raman peaks associated to the Raman band and the temperature of the calibration material.

Certain embodiments of the method according to the second embodiment further comprise a method step of determining the relationship between ratios of the peak intensities of Stokes Raman peaks and anti-Stokes Raman peaks associated to the Raman band and the temperature of the calibration material based on peak intensities of Stokes Raman peaks and corresponding anti-Stokes Raman peaks included in the emission spectra of the calibration material and the temperatures of the calibration material for which the emission spectra have been determined.

In certain embodiments, for at least one or each Raman spectrometer adjusting the determination of spectral intensity values of intensity spectra performed by the respective Raman spectrometer is performed by based on the emission spectra determining a reference spectrum exhibited by the calibration material at the temperature that has been determined based on the calibration spectrum, and determining and applying spectral correction terms, spectral correction factors or a spectral correction function for correcting the spectral intensity values determined by the respective Raman spectrometer such, that the corrected spectral intensity values of the calibration spectrum correspond to the spectral intensity values of the reference spectrum throughout the spectral measurement range.

In certain embodiments, the at least two different temperatures for which the emission spectra are determined cover a predetermined temperature range, a temperature range of 10° C. to 50° C. or a temperature range of −20° C. to 100° C.

The present disclosure further includes a calibration material for calibrating a spectral responsivity of at least one Raman spectrometer, the calibration material comprising a reference material configured to emit a broadband spectrum of luminescence light in response to the reference material receiving excitation light having a desired excitation wavelength, and an additional material exhibiting a distinct Raman band within a spectral measurement range of the Raman spectrometer(s) to be calibrated.

In certain embodiments of the calibration material the reference material is a standard reference material (SRM) or a fluorescent glass.

In certain embodiments of the calibration material additional material is carbon, diamond, sapphire, silicon, calcium fluoride ($CaF_2$) or lithium niobate ($LiNbO_3$).

The disclosure further includes an embodiment of the calibration material, wherein the additional material is a material exhibiting a single Raman band within the spectral measurement range of the Raman spectrometer(s), a material exhibiting a narrow Raman band within the spectral measurement range of the Raman spectrometer(s), and/or a material exhibiting a Raman band exhibiting a Raman peak having a full width at half maximum smaller or equal to a given percentage, a percentage of 10% or a percentage of 1% of a width of the spectral measurement range of the Raman spectrometer(s).

In certain embodiments of the calibration material, the additional material is distributed in the reference material, or at least one layer of the additional material, each covers an exterior surface of the reference material.

BRIEF DESCRIPTION OF THE DRAWINGS

The described embodiments and other features, advantages and disclosures contained herein, and the manner of attaining them, will become apparent and the present disclosure will be better understood by reference to the following description of various embodiments of the present disclosure taken in junction with the accompanying drawings, wherein.

DETAILED DESCRIPTION

The present disclosure includes a calibration material CM for calibrating a spectral responsivity of at least one Raman spectrometer 100 and a method of calibrating a spectral responsivity of at least one Raman spectrometer 100 using this calibration material CM.

Figure 1:
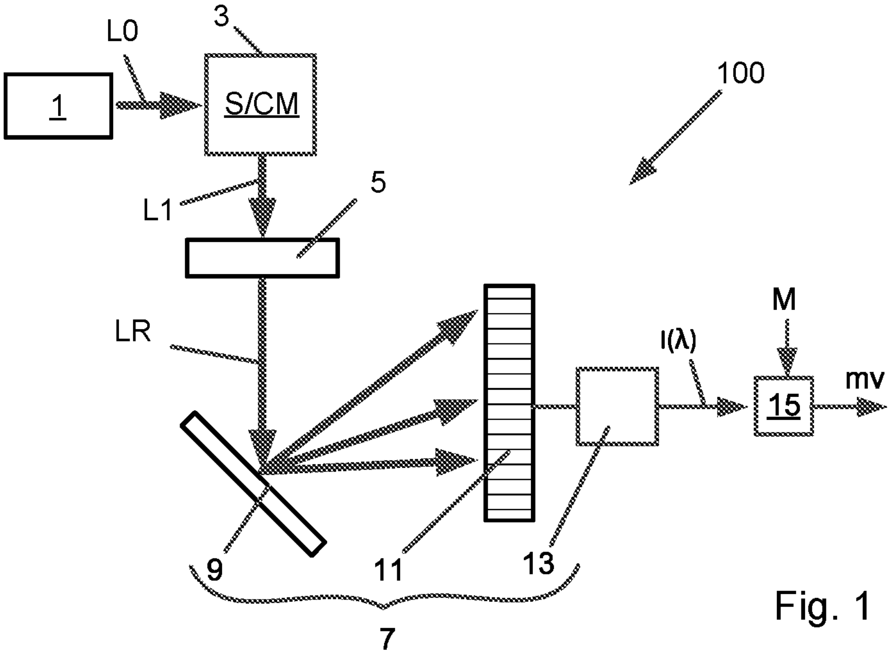
FIG. 1 shows a Raman spectrometer.

An example of a Raman spectrometer 100 is shown in FIG. 1. The Raman spectrometer 100 includes a monochromatic light source 1, e.g., a laser, configured to transmit excitation light L0 having a desired excitation wavelength $\lambda_0$ to a measurement region 3 configured to accommodate a sample S of a medium.

In certain embodiments, the excitation wavelength $\lambda_0$ is, e.g., a wavelength in the visual or near infrared wavelengths range. As non-limiting examples, the excitation wavelength $\lambda_0$ may be a wavelength of 785 nm, of 532 nm, of 405 nm or another wavelength in the visual or near infrared wavelengths range.

In certain embodiments, the Raman spectrometer 100 may include a filter 5, e.g., a notch-filter, configured to filter out measurement light LR included in light L1 emanating from the measurement region 3.

The Raman spectrometer 100 further includes a spectrometric unit 7 configured to receive measurement light LR emanating from the illuminated sample S and configured to determine and to generate intensity spectra I(λ) of the measurement light LR.

The intensity spectra I(λ) are, e.g., each determined in a spectral range including a spectral measurement range Δλ of the Raman spectrometer 100. The spectral measurement range Δλ is, e.g., a wavelength range or a wavenumber range corresponding to a range of positive wavenumber shifts of Raman scattered light induced by the excitation light L0 having the excitation wavelength $\lambda_0$.

In at least one embodiment, the spectral measurement range Δλ is a range covering a Stokes region of Raman spectra including spectral lines corresponding to wavelengths larger than the excitation wavelength $\lambda_0$, e.g., a range corresponding to a wavenumber shift range including wavenumber shifts larger or equal to 0 $cm^{-1}$ and smaller or equal to 4500 $cm^{-1}$, or a sub-range of this wavenumber shift range that is of particular interest with respect to the measurand(s) to be measured with the Raman spectrometer 100.

In at least one embodiment, the spectrometric unit 7 includes a disperser 9, e.g., a diffractive or holographic grating, adapted to disperse the incident measurement light LR, a detector 11 configured to receive the dispersed measurement light LR, and a signal processor 13, e.g., a microprocessor, connected to the detector 11. The detector 11 is configured to generate and to provide detector signals corresponding to spectral intensities of the incident dispersed measurement light LR. The signal processor 13 is configured to generate and to provide intensity spectra I(λ) of the measurement light LR based on the detector signals.

FIG. 1 shows an exemplary embodiment, wherein the detector 11 includes an array of detection elements, e.g., an array of charge coupled devices (CCD) or an array of photodiodes, each receiving a portion of the dispersed light and generating and providing a detector signal corresponding to the intensity of the received fraction to the signal processor 13 determining spectral intensity values of the intensity spectra I(λ) based on the detector signals.

In certain embodiments at least one or each Raman spectrometer 100 is configured for measuring at least one measurand of a medium, e.g., for measuring a concentration of at least one component included in the medium, a pH-value of the medium, a melt index of the medium, a cell motility of the medium, and/or another property of interest of the medium.

During measurement of a measurand, a sample S of the medium is positioned in the measurement region 3 and illuminated by the light source 1. In this case, the measurement light LR includes Raman scattered light emanating from the illuminated sample S, and the intensity spectra I(λ) generated by the spectrometric unit 7 are Raman spectra of the sample S of the medium. The thus-determined Raman spectra are, e.g., provided to an evaluation unit 15, which determines and provides measurement values mv of the respective measurand based on a previously determined model M for determining the measurement values mv based on the spectral intensities of the Raman spectra generated by the spectrometric unit 7. The evaluation unit 15 is, e.g., an integral component of the Raman spectrometer 100 or is an external unit configured to receive the intensity spectra I(λ) determined by the spectrometric unit 7. In either case, the evaluation unit 15 is, e.g., connected to or communicating with the spectrometric unit 7.

Figure 2:
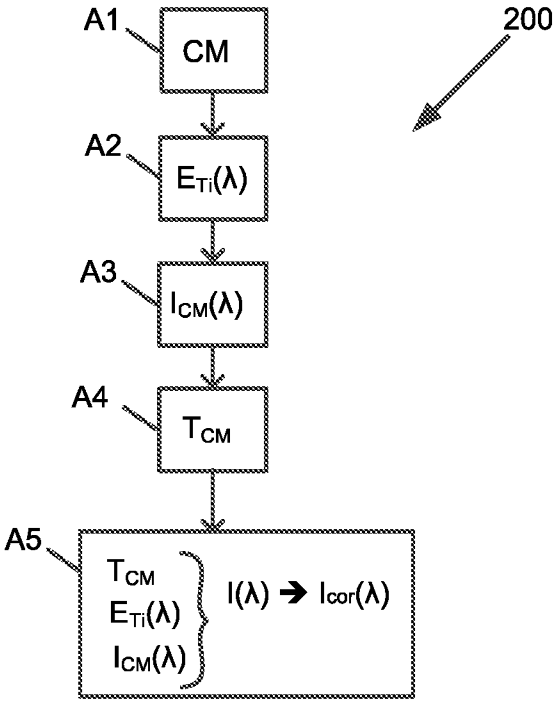
FIG. 2 shows a flow chart of a calibration method according to the present disclosure.

As illustrated in the flow chart shown in FIG. 2, a method 200 for calibrating at least one Raman spectrometer 100 disclosed herein includes a method step A1 of providing a calibration material CM for calibrating a spectral responsivity of one or more Raman spectrometers 100.

The calibration material CM disclosed herein comprises a reference material configured to emit a broadband spectrum of luminescence light in response to the reference material receiving excitation light having the desired excitation wavelength $\lambda_0$ and an additional material exhibiting a distinct Raman band within the measurement range Δλ of the Raman spectrometer 100 to be calibrated.

Including the reference material in the calibration material CM provides an advantage of enabling calibrations of the spectral responsivity of the Raman spectrometer 100 to be performed throughout the entire spectral measurement range Δλ covered by the broadband emission spectrum of the reference material. The additional material included in the calibration material CM provides the advantage of enabling a temperature TCM of the calibration material CM to be determined by Raman thermometry.

With respect to the reference material, materials employed in the art for the purpose of relative intensity correction of Raman spectroscopic instruments may be used. As an example, in certain embodiments, the reference material is, e.g., a material given by an SRM developed by the NIST. In such an embodiment, the reference material is, e.g., a specific type of fluorescent glass. As an alternative, another type of material emitting a broadband spectrum of luminescence light in response to receiving the excitation light may be used as reference material.

With respect to the additional material, various Raman active substances may be used, including elements or compounds exhibiting a definite Raman signature.

In certain embodiments, the additional material is, e.g., a material exhibiting a single Raman band within the spectral measurement range Δλ. In addition or as an alternative, the additional material is, e.g., a material exhibiting a narrow Raman band, e.g., a narrow band exhibiting a Raman peak having a full width at half maximum smaller or equal to a given percentage of a width of the spectral measurement range Δλ, e.g., a percentage of 10% or, e.g., only 1%.

As an example, in certain embodiments, the additional material is, e.g., carbon, diamond, sapphire, silicon, calcium fluoride ($CaF_2$) or lithium niobate ($LiNbO_3$).

Figure 3:
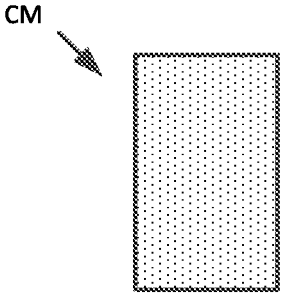
FIG. 3 shows a calibration material including an additional material distributed in a reference material.

Regardless of the type of additional material employed, in certain embodiments, the additional material is, e.g., distributed in the reference material. In such embodiments, providing the calibration material CM, e.g., may include manufacturing the calibration material CM by melting the reference material and distributing a powder, e.g., a finely pulverized powder, of the additional material in the melted reference material, e.g., in a melted fluorescent glass. FIG. 3 shows an example of a corresponding calibration material CM, wherein the additional material distributed in the reference material is indicated by dots.

Figure 4:
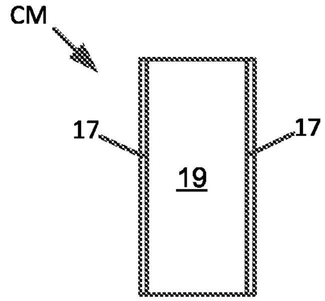
FIG. 4 shows a calibration material including layers of an additional material on exterior surfaces of a reference material.

In an alternative embodiment, the additional material is, e.g., included in the calibration material CM in the form of at least one layer 17 of the additional material, each layer 17 covering an exterior surface of the reference material 19. In such embodiments, providing the calibration material CM, e.g., may include manufacturing the calibration material CM by applying the or each layer 17 of the additional material onto a corresponding external surface of the reference material 19. As an example, each layer 17 of the additional material is, e.g., deposited onto an existing reference material 19, e.g., a fluorescent glass, e.g., an SRM developed by NIST, using a deposition process, e.g., a low temperature deposition process, e.g., a vacuum deposition process. This manufacturing method provides an advantage of not requiring a melting the reference material 19. FIG. 4 shows an embodiment of a corresponding calibration material CM, wherein layers 17 of the additional material are applied on opposing external surfaces of the reference material 19.

As illustrated in FIG. 2, the method 200 further includes a method step A2 of, for at least two different temperatures Ti, determining an emission spectrum $E_{Ti}(\lambda)$ of light emitted by the calibration material CM, each exhibiting the respective temperature Ti in response to the calibration material CM receiving excitation light having the excitation wavelength $\lambda_0$.

The emission spectra $E_{Ti}(\lambda)$ are, e.g., each determined based on at least one intensity spectrum generated and provided by a spectroscopic measurement instrument illuminating the calibration material CM with excitation light having the excitation wavelength $\lambda_0$ while the calibration material CM exhibits the respective temperature Ti and determining and generating the intensity spectrum of the light emitted by the illuminated calibration material CM in response. As an example, the emission spectra $E_{Ti}(\lambda)$ are, e.g., each determined under laboratory conditions, wherein the temperature Ti of the calibration material CM is controlled and/or measured by a temperature measurement device during the determination of each emission spectrum $E_{Ti}(\lambda)$.

Because the calibration material CM comprises the reference material and the additional material, the temperature-dependent emission spectra $E_{Ti}(\lambda)$ each correspond to a superposition of the temperature-dependent broadband emission spectrum of the reference material and the Raman scattered light emitted by the additional material.

Figure 5:
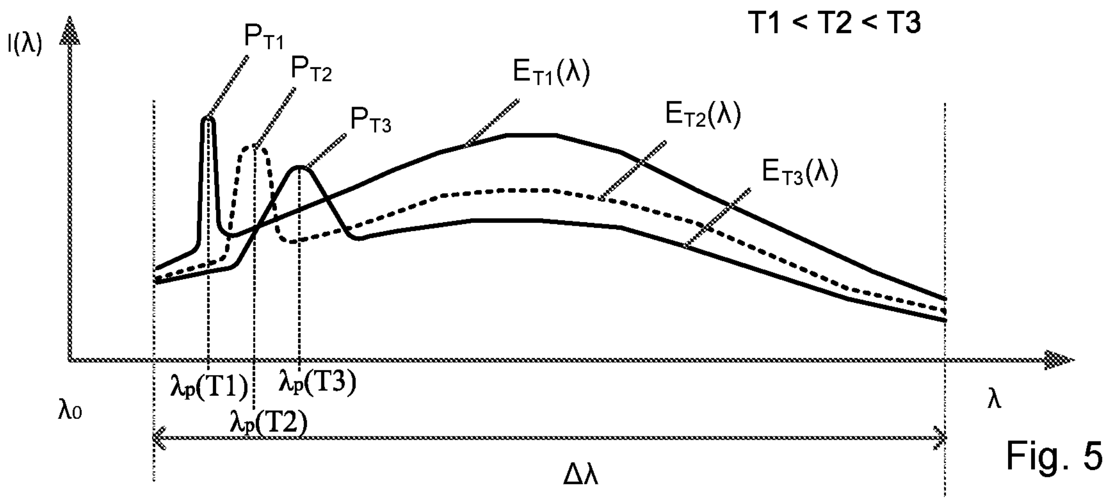
FIG. 5 shows emission spectra of a calibration material at different temperatures.

This superposition is depicted in FIG. 5, showing exemplary emission spectra $E_{Ti}(\lambda)$ of the same calibration material CM at different temperatures Ti in the spectral measurement range $\Delta\lambda$. The exemplary emission spectra $E_{Ti}(\lambda)$ shown include a first emission spectrum $E_{Ti}(\lambda)$ determined at a first temperature T1, a second emission spectrum $E_{T2}(\lambda)$ determined at a second temperature T2, and a third emission spectrum $E_{T3}(\lambda)$ determined at a third temperature T3, wherein the second temperature T2 is higher than the first temperature T1 and the third temperature T3 is higher than the second temperature T2.

In certain embodiments, the different temperatures Ti, e.g., cover a predetermined temperature range, e.g., a temperature range of 10° C. to 50° C. or, e.g., of −20° C. to 100° C.

As shown in FIG. 5, the additional material exhibiting the distinct Raman band causes each emission spectrum $E_{Ti}(\lambda)$ to exhibit a distinct Raman peak $P_{Ti}$ associated to the Raman band, which is superimposed on the broadband emission spectrum of the reference material.

The method 200 further includes calibrating each Raman spectrometer 100 by performing: a method step A3 of determining a calibration spectrum $I_{CM}(\lambda)$ of the calibration material CM with the respective Raman spectrometer 100; a method step A4 of determining the temperature $T_{CM}$ of the calibration material CM of based on the Raman band included in the calibration spectrum $I_{CM}(\lambda)$; and a method step A5 of adjusting the determination of spectral intensity values of the intensity spectra $I(\lambda)$ performed by the respective Raman spectrometer 100 based on the calibration spectrum $I_{CM}(\lambda)$, the temperature $T_{CM}$ of the calibration material CM during determination of the calibration spectrum $I_{CM}(\lambda)$ and the previously determined emission spectra $E_{Ti}(\lambda)$ of the calibration material CM.

In the method step A3, the determination of the calibration spectrum $I_{CM}(\lambda)$ is, e.g., performed by positioning the calibration material CM in the measurement region 3 of the Raman spectrometer 100, such that the light source 1 transmits the excitation light L0 having the desired excitation wavelength $\lambda_0$ to the calibration material CM, and by determining and generating the calibration spectrum $I_{CM}(\lambda)$ of the measurement light LR emanating from the illuminated calibration material CM using the spectrometric unit 7.

In the method step A4, the temperature $T_{CM}$ of the calibration material CM is determined based on the Raman band included in the calibration spectrum $I_{CM}(\lambda)$ by performing a method of Raman thermometry. Examples of methods of Raman thermometry that can be used in the method step A4 are, e.g., described in the article titled "Raman Thermometry" by David Tuschel, published on Dec. 1, 2016, in Spectroscopy, Volume 31, Issue 12, pages 8 to 13. As outlined in this article, the temperature of a material can be determined based on the temperature-dependent ratio of the Stokes and anti-Stokes signal strength of a given Raman band, and the temperature of materials exhibiting a sufficiently narrow Raman band can also be determined based on the temperature-dependent position of an associated Raman peak.

As is apparent from the emission spectra $E_{Ti}(\lambda)$ shown in FIG. 5, the peak position $\Delta p(Ti)$ of the Raman peaks $P_{Ti}$ included in the emission spectra $E_{Ti}(\lambda)$ shifts to longer wavelengths as the temperature Ti of the calibration material CM increases. Correspondingly, the method 200, e.g., includes a first embodiment, wherein the temperature $T_{CM}$ of the calibration material CM is determined based on a peak position $\lambda_P(T_{CM})$ of a Raman peak P associated to the Raman band exhibited by the additional material in the calibration spectrum $I_{CM}(\lambda)$.

Figure 6:
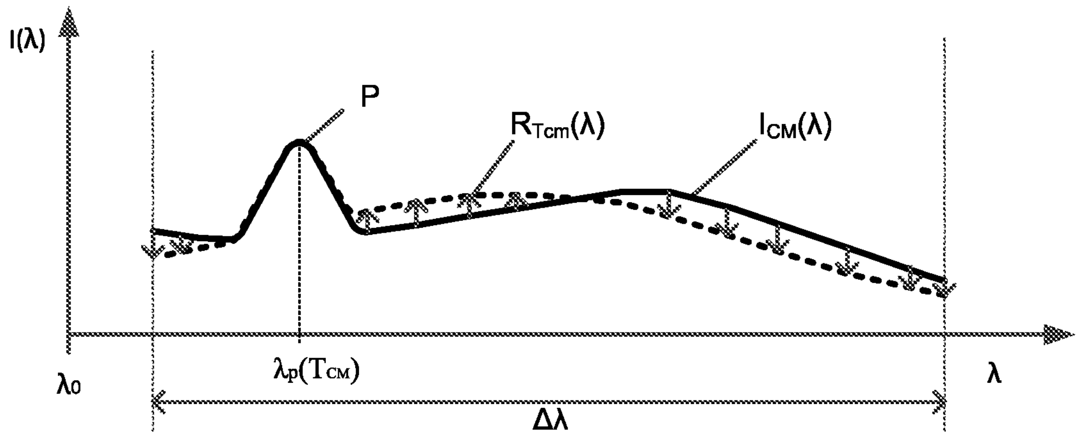
FIG. 6 shows a calibration spectrum and a reference spectrum.

The first embodiment is depicted in FIG. 6 showing an example of a calibration spectrum $I_{CM}(\lambda)$ of the calibration material CM exhibiting the temperature-dependent emission spectra $E_{Ti}(\lambda)$ shown in FIG. 5. In this first embodiment, the method step A4 includes determining the peak position $\Delta_P(T_{CM})$ of the Raman peak P included in the calibration spectrum $I_{CM}(\lambda)$ of the calibration material CM determined by the Raman spectrometer 100 to be calibrated and determining the temperature $T_{CM}$ of the calibration material CM during determination of the calibration spectrum $I_{CM}(\lambda)$ based the peak position $\Delta_P(T_{CM})$ of the Raman peak P in the calibration spectrum $I_{CM}(\lambda)$ and a previously determined relationship between peak positions of the Raman peak associated to the Raman band exhibited by the additional material and the temperature of the calibration material CM.

In certain embodiments, the relationship is, e.g., a relationship determined based on the emission spectra $E_{Ti}(\lambda)$ determined in the method step A2 for the different temperatures Ti. In such an embodiment, the method 200, e.g., includes determining the relationship based on the peak positions $\Delta p(Ti)$ of the Raman peaks $P_{Ti}$ included in emission spectra $E_{Ti}(\lambda)$ and the corresponding temperatures Ti of the calibration material CM at which the emission spectra $E_{Ti}(\lambda)$ have been determined.

As an alternative, the relationship is, e.g., determined in the same manner based on emission spectra emitted by the additional material at different temperatures.

Determining the temperature $T_{CM}$ of the calibration material CM based on the peak position $\Delta p(Ti)$ of the Raman peak P is particularly suitable in embodiments in which the additional material included in the calibration material CM exhibits a single and/or a narrow Raman band within the spectral measurement range $\Delta\lambda$ of the Raman spectrometer 100 to be calibrated. In addition or as an alternative, the additional material is, e.g., a material exhibiting a high temperature dependency of the peak position. This high temperature dependency of the peak position provides an advantage of enabling a higher measurement accuracy of the temperature determination to be achieved.

In the embodiments depicted in FIGS. 5 and 6, the measurement range $\Delta\lambda$ covers a Stokes region corresponding to wavelengths exceeding the excitation wavelength $\lambda_0$. Correspondingly, the Raman peaks $P_{Ti}$ included in the emission spectra $E_{Ti}(\lambda)$ and the Raman peak P included in the calibration spectrum $I_{CM}(\lambda)$ correspond to Stokes Raman peaks associated to the Raman band. Stokes Raman peaks exhibit a higher intensity than the corresponding anti-Stokes Raman peaks in a wide temperature range. Thus, even though the peak intensity of Stokes Raman peaks decreases as the temperature increases, using the Stokes Raman peak to determine the temperature $T_{CM}$ of the calibration material CM rather than the corresponding anti-Stokes Raman peak provides advantages of enabling the Raman peaks P included in the calibration spectra $I_{CM}(\lambda)$ to be easily identified, enabling their peak position $\Delta p(T_{CM})$ to be accurately determined, and enabling the temperature $T_{CM}$ of the calibration material CM to be determined accurately-all in a wide temperature range.

In certain embodiments, the Raman spectrometer 100 to be calibrated, e.g., includes at least one dual range spectrometer capable of determining intensity spectra $I(\lambda)$ in a range including the spectral measurement range $\Delta\lambda$ covering a Stokes region of the Raman spectra, which includes spectral lines corresponding to wavelengths that are longer than the excitation wavelength $\lambda_0$, and an additional range $\Delta\lambda 2$ covering an anti-Stokes region of the Raman spectra, which includes spectral lines corresponds to wavelengths that are shorter than the excitation wavelength $\lambda_0$.

In such embodiments, the method 200, e.g., includes, for at least one or each dual range spectrometer, performing the method step A4 by determining the temperature $T_{CM}$ of the calibration material CM based on a temperature-dependent ratio of the Stokes and anti-Stokes signal strength of the distinct Raman band of the additional material.

In such an embodiment, the emission spectra $E_{Ti}(\lambda)$ of the calibration material CM at the different temperatures Ti determined in the method step A2 and the calibration spectrum $I_{CM}(\lambda)$ of the calibration material CM determined in the method step A3 are, e.g., each determined in a spectral range including the spectral measurement range $\Delta\lambda$ and the additional range $\Delta\lambda$ 2.

Figure 7:
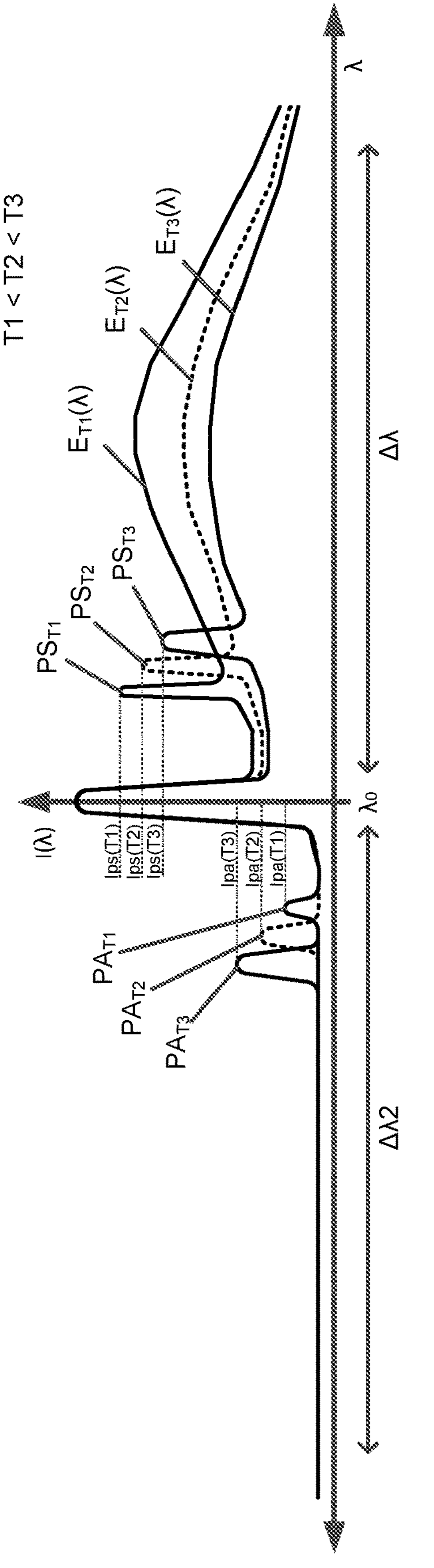
FIG. 7 shows emission spectra of a calibration material at different temperatures in a spectral measurement range and an additional spectral range.

As illustrated in FIG. 7, which shows exemplary emission spectra $E_{Ti}(\lambda)$ of the same calibration material CM at different temperatures Ti, in this embodiment, the distinct Raman band associated to the additional material results in the emission spectra $E_{Ti}(\lambda)$, each including a Stokes Raman peak $PS_{Ti}$, which is superimposed on the temperature-dependent broadband emission spectrum of the reference material in the measurement range $\Delta\lambda$, and a corresponding anti-Stokes Raman peak $PA_{Ti}$ occurring in the additional range $\Delta\lambda 2$.

Figure 8:
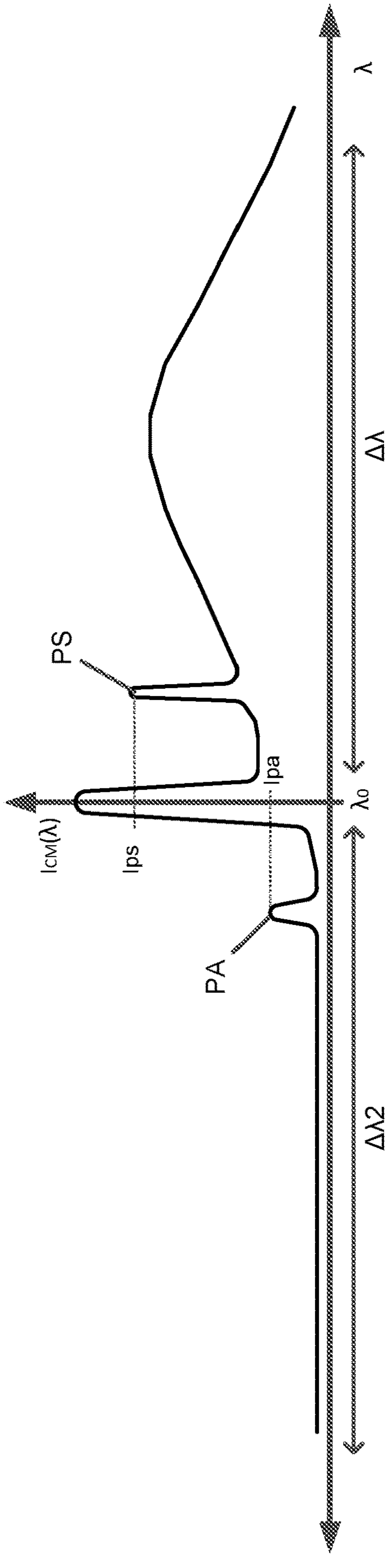
FIG. 8 shows a calibration spectrum of the calibration material exhibiting the emission spectra shown in FIG. 7 in the spectral measurement range and the additional range.

Analogously, as illustrated in FIG. 8, which shows an example of a calibration spectrum $I_{CM}(\lambda)$ of the calibration material CM exhibiting the emission spectra $E_{Ti}(\lambda)$ shown in FIG. 7, the calibration spectrum $I_{CM}(\lambda)$ determined in the method step A3 exhibits a Stokes Raman peak PS superimposed on the temperature-dependent broadband emission spectrum of the reference material in the measurement range $\Delta\lambda$ and a corresponding anti-Stokes Raman peak PA occurring in the additional range $\Delta\lambda 2$.

As in the previous example, the exemplary emission spectra $E_{Ti}(\lambda)$ shown in FIG. 7 include a first emission spectrum $E_{Ti}(\lambda)$ determined at a first temperature T1, a second emission spectrum $E_{T2}(\lambda)$ determined at a second temperature T2, and a third emission spectrum $E_{T3}(\lambda)$ determined at a third temperature T3, wherein the second temperature T2 is higher than the first temperature T1 and the third temperature T3 is higher than the second temperature T2. Again, the different temperatures Ti, e.g., cover a predetermined temperature range, e.g., a temperature range of 10° C. to 50° C. or, e.g., of −20° C. to 100° C.

As is apparent from the emission spectra $E_{Ti}(\lambda)$ shown in FIG. 7, the peak intensity Ips(Ti) of the Stokes peaks $PS_{Ti}$ decreases with increasing temperature Ti, and the peak intensity Ipa(Ti) of the anti-Stokes peaks $PA_{Ti}$ increases with increasing temperature Ti.

Correspondingly, in certain embodiments, for at least one of the dual range spectrometers, the method step A4, e.g., includes determining a ratio of the peak intensity Ips of the Stokes Raman peak PS included in the calibration spectrum $I_{CM}(\lambda)$ within the measurement range $\Delta\lambda$ and the peak intensity Ipa of the anti-Stokes Raman peak PA included in the calibration spectrum $I_{CM}(\lambda)$ within the additional range $\Delta\lambda 2$. Following this determination, the temperature $T_{CM}$ of the calibration material CM is then determined based on the ratio of the peak intensity Ips of the Stokes Raman peak PS and the peak intensity Ipa of the anti-Stokes Raman peak PA included in the calibration spectrum $I_{CM}(\lambda)$ and based on a previously determined relationship between ratios of peak intensities of the Stokes Raman peaks and the anti-Stokes Raman peaks and the temperature of the calibration material CM.

In certain embodiments, the relationship between ratios of peak intensities of the Stokes Raman peaks and the anti-Stokes Raman peaks and the temperature of the calibration material CM is, e.g., a relationship that was determined based on the emission spectra $E_{Ti}(\lambda)$ covering the measurement range $\Delta\lambda$ and the additional range $\Delta\lambda$ 2 determined in the method step A2 for the different temperatures Ti. In such an embodiment, the method 200, e.g., includes determining the relationship based on the ratios of the peak intensity Ips(Ti) of the Stokes peaks $PS_{Ti}$ and the peak intensity Ipa(Ti) of the corresponding anti-Stokes peaks $PA_{Ti}$ included in emission spectra $E_{Ti}(\lambda)$ and the corresponding temperatures Ti of the calibration material CM at which the emission spectra $E_{Ti}(\lambda)$ have been determined.

Regardless of the particular operation performed in the method step A4 to determine the temperature $T_{CM}$ of the calibration material CM, in the method step A5, the determination of the intensity values of the intensity spectra $I(\lambda)$ performed by the Raman spectrometer 100 to be calibrated is adjusted based on the calibration spectrum $I_{CM}(\lambda)$ determined in the method step A3, the temperature $T_{CM}$ of the calibration material CM determined in the method step A4, and the emission spectra $E_{Ti}(\lambda)$ determined in the method step A2.

In certain embodiments, the method step A5, e.g., includes determining a reference spectrum $R_{Tcm}(\lambda)$ exhibited by the calibration material at the temperature $T_{CM}$ that has been determined based on the calibration $I_{CM}(\lambda)$ based on the emission spectra $E_{Ti}(\lambda)$. An example of a corresponding reference spectrum $R_{Tcm}(\lambda)$ is shown in FIG. 6.

Where the emission spectra $E_{Ti}(\lambda)$ determined in the method step A2 include an emission spectrum $E_{Ti}(\lambda)$ determined for this temperature $T_{CM}$, this emission spectrum $E_{Ti}(\lambda)$ is used as reference spectrum $R_{Tcm}(\lambda)$. In all other conditions, the reference spectrum $R_{Tcm}(\lambda)$ is, e.g., determined by interpolation based on at least two of the previously determined emission spectra $E_{Ti}(\lambda)$.

Subsequently, adjustment of the determination of the intensity values of the intensity spectra $I(\lambda)$ performed by the Raman spectrometer 100 to be calibrated is, e.g., performed as illustrated by the arrows shown in FIG. 6 by determining and applying spectral correction terms, spectral correction factors or a spectral correction function for correcting the spectral intensity values determined by the Raman spectrometer 100 such that the corrected spectral intensity values of the calibration spectrum $I_{CM}(\lambda)$ correspond to the spectral intensity values of the reference spectrum $R_{Tcm}(\lambda)$ throughout the spectral measurement range $\Delta\lambda$.

Following such adjustment, intensity spectra $I(\lambda)$ determined and provided by the thus-calibrated Raman spectrometer 100 are then given by correspondingly corrected intensity spectra $I_{cor}(\lambda)$.

In certain embodiments, the same calibration material CM is, e.g., employed to calibrate multiple Raman spectrometers 100 that include light sources 1 generating monochromatic light of the same desired excitation wavelength $\lambda_0$. This use of the calibration material CM provides advantages of: the emission spectra $E_{Ti}(\lambda)$ and the relationship employed to determine the temperature $T_{CM}$ of the calibration material CM during each of these calibrations only needs to be determined once; and at least one model for determining measurement values mv of a measurand can be used on each of the thus calibrated Raman spectrometers 100.

The invention claimed is:

1. A method of calibrating at least one Raman spectrometer, which at least one Raman spectrometer includes a monochromatic light source configured to transmit excitation light having a desired excitation wavelength to a measurement region, which is configured to accommodate a sample of a medium, and to illuminate the sample with the excitation light, and a spectrometric unit configured to receive measurement light emanating from the illuminated sample and configured to determine and to provide intensity spectra of the received measurement light in a spectral measurement range, the method comprising:
- providing a calibration material comprising:
  - a reference material configured to emit a broadband spectrum of luminescence light in response to the excitation light; and
  - an additional material, which exhibits a distinct Raman band within the spectral measurement range of the at least one Raman spectrometer to be calibrated;
- for at least two different temperatures, determining an emission spectrum of light emitted by the calibration material at each respective temperature in response to the calibration material receiving excitation light having the excitation wavelength; and
- calibrating each of the at least one Raman spectrometers by:
  - with the respective Raman spectrometer, determining a calibration spectrum of the calibration material;
  - based on the Raman band, which is included in the calibration spectrum, determining a temperature of the calibration material by performing a Raman thermometry method; and
  - adjusting a determination of spectral intensity values of intensity spectra performed by the respective Raman spectrometer, wherein the adjusting is based on the calibration spectrum, the temperature of the calibration material during the determination of the calibration spectrum, and the previously determined emission spectra of the calibration material.

2. The method according to claim 1, wherein providing the calibration material includes manufacturing the calibration material by melting the reference material and distributing a powder of the additional material in the melted reference material.

3. The method according to claim 1, wherein providing the calibration material includes manufacturing the calibration material by:
- applying at least one layer of the additional material onto an exterior surface of the reference material; or
- depositing at least one layer of the additional material onto an exterior surface of the reference material using a deposition process, a low temperature deposition process, or a vacuum deposition process.

4. The method according to claim 1, wherein for the at least one Raman spectrometer the temperature of the calibration material is determined based on the calibration spectrum by:
- determining a peak position of a Raman peak associated to the Raman band of the additional material that is included in the calibration spectrum; and
- determining the temperature of the calibration material based on the peak position of the Raman peak and on a previously determined relationship between peak positions of Raman peaks associated to the Raman band exhibited by the additional material and the temperature of the calibration material.

5. The method according to claim 4, the method further comprising determining the relationship between peak positions of Raman peaks associated to the Raman band exhibited by the additional material and the temperature of the calibration material based on peak positions of Raman peaks included in emission spectra and the temperatures of the calibration material for which the emission spectra have been determined.

6. The method according to claim 4, wherein the Raman peaks are Stokes peaks occurring in the spectral measurement range of the at least one Raman spectrometer.

7. The method according to claim 1, wherein:
- the at least one Raman spectrometer includes at least one dual range spectrometer configured to determine intensity spectra in a range, which includes the spectral measurement range and an additional range, wherein the spectral measurement range is a range covering a Stokes region including spectral lines corresponding to wavelengths that are longer than the excitation wavelength, and wherein the additional range is a range covering an anti-Stokes region including spectral lines corresponding to wavelengths that are shorter than the excitation wavelength;
- the emission spectra of the calibration material are each determined in a spectral range including the spectral measurement range and the additional range; and
- for each of the at least one dual range spectrometers:
- the calibration spectrum of the calibration material is determined in the spectral range including the spectral measurement range and the additional range; and
- the temperature of the calibration material is determined based on the calibration spectrum by:
- determining a ratio of a peak intensity of a Stokes Raman peak included in the calibration spectrum and a peak intensity of an anti-Stokes Raman peak included in the calibration spectrum, wherein the Stokes Raman peak and the anti-Stokes Raman peak are both associated to the Raman band of the additional material; and determining the temperature of the calibration material based on the ratio of the peak intensity of the Stokes Raman peak included in the calibration spectrum and the peak intensity of an anti-Stokes Raman peak included in the calibration spectrum and on a previously determined relationship between ratios of the peak intensities of Stokes Raman peaks and anti-Stokes Raman peaks associated to the Raman band and the temperature of the calibration material.

8. The method according to claim 7, the method further comprising determining the relationship between ratios of the peak intensities of Stokes Raman peaks and anti-Stokes Raman peaks associated to the Raman band and the temperature of the calibration material based on peak intensities of Stokes Raman peaks and corresponding anti-Stokes Raman peaks included in the emission spectra of the calibration material and on the temperatures of the calibration material for which the emission spectra have been determined.

9. The method according to claim 1, wherein adjusting the determination of spectral intensity values of intensity spectra performed by the at least one Raman spectrometer includes:

based on the emission spectra, determining a reference spectrum exhibited by the calibration material at the temperature that was determined based on the calibration spectrum; and determining and applying spectral correction terms, spectral correction factors or a spectral correction function for correcting the spectral intensity values determined by the at least one Raman spectrometer such that the corrected spectral intensity values of the calibration spectrum correspond to the spectral intensity values of the reference spectrum throughout the spectral measurement range.

10. The method according to claim 1, wherein the at least two different temperatures for which the emission spectra are determined cover a predetermined temperature range of −20° C. to 100° C.

11. The method according to claim 1, wherein the predetermined temperature range is 10° C. to 50° C.

12. A calibration material for calibrating a spectral responsivity of at least one Raman spectrometer, the calibration material comprising:

a reference material configured to emit a broadband spectrum of luminescence light in response to the reference material receiving excitation light having a desired excitation wavelength; and an additional material exhibiting a distinct Raman band within a spectral measurement range of the at least one Raman spectrometer to be calibrated, wherein the additional material enables a Raman thermometric method to determine a temperature of the calibration material during calibration of the at least one Raman spectrometer.

13. The calibration material according to claim 12, wherein the reference material is a standard reference material (SRM) or a fluorescent glass.

14. The calibration material according to claim 12, wherein the additional material is carbon, diamond, sapphire, silicon, calcium fluoride ($CaF_2$), or lithium niobate ($LiNbO_3$).

15. The calibration material according to claim 12, wherein the additional material is a material exhibiting at least one of:

a single Raman band within the spectral measurement range of the at least one Raman spectrometer;

a narrow Raman band within the spectral measurement range of the at least one Raman spectrometer; and a Raman band exhibiting a Raman peak having a full width at half maximum smaller or equal to a given percentage of a width of the spectral measurement range, wherein the given percentage is 10%.

16. The calibration material according to claim 12, wherein the given percentage is 1%.

17. The calibration material according to claim 12, wherein:

the additional material is distributed in the reference material; or at least one layer of the additional material, the at least one layer covering an exterior surface of the reference material.

* * * * *